United States Patent
Seki

(10) Patent No.: US 11,776,107 B2
(45) Date of Patent: Oct. 3, 2023

(54) INSPECTION METHOD, PROGRAM, INSPECTION DEVICE, AND PRINTING DEVICE

(71) Applicant: FUJIFILM Corporation, Tokyo (JP)

(72) Inventor: Masaki Seki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 265 days.

(21) Appl. No.: 17/371,259

(22) Filed: Jul. 9, 2021

(65) Prior Publication Data

US 2021/0334953 A1 Oct. 28, 2021

Related U.S. Application Data

(63) Continuation of application No. PCT/JP2020/008728, filed on Mar. 2, 2020.

(30) Foreign Application Priority Data

Mar. 4, 2019 (JP) .................................. 2019-038681

(51) Int. Cl.
*H04N 1/00* (2006.01)
*G06T 7/00* (2017.01)
(Continued)

(52) U.S. Cl.
CPC .......... *G06T 7/0004* (2013.01); *G06K 15/023* (2013.01); *G06T 7/73* (2017.01);
(Continued)

(58) Field of Classification Search
CPC .......... H04N 1/00002; H04N 1/00005; H04N 1/00029; H04N 1/00037; H04N 1/00045; H04N 1/00076; G06K 15/023
(Continued)

(56) References Cited

U.S. PATENT DOCUMENTS

2012/0121139 A1* 5/2012 Kojima ............... B41F 33/0036
   382/112
2018/0096472 A1* 4/2018 Ukishima ............ H04N 1/6041
2018/0293732 A1 10/2018 Oki

FOREIGN PATENT DOCUMENTS

CN 108267455 A 7/2018
JP 2005205703 A 8/2005
(Continued)

OTHER PUBLICATIONS

International Preliminary Report on Patentability with translation of Written Opinion dated Aug. 25, 2021, in International Application No. PCT/JP2020/008728.
(Continued)

*Primary Examiner* — Kent Yip
(74) *Attorney, Agent, or Firm* — Sughrue Mion, PLLC

(57) ABSTRACT

Provided are an inspection method, a program, an inspection device, and a printing device capable of realizing a uniform inspection in a defect inspection of a printed article using a special substrate. A method includes an imaging data acquisition step (S14) of acquiring imaging data (48) of a printed article using a special substrate, a non-printing region positional information acquisition step (S16) of acquiring information (44) for specifying a position of a non-printing region in the imaging data, the non-printing region corresponding to a substrate region of the printed article on which a pattern and a background of the pattern are not printed, an inspection step (S20) of specifying the non-printing region, analyzing the imaging data by applying a predetermined inspection rule (46), and performing an inspection of the printed article, and a notification step (S22) of performing a notification of an inspection result (50) and not performing a notification of an inspection result indicating that a defect
(Continued)

is present in the substrate region of the printed article corresponding to the non-printing region.

21 Claims, 6 Drawing Sheets

(51) Int. Cl.
    *G06T 7/73*         (2017.01)
    *G06T 7/90*         (2017.01)
    *G06K 15/02*       (2006.01)

(52) U.S. Cl.
    CPC ........... *G06T 7/90* (2017.01); *H04N 1/00005* (2013.01); *H04N 1/00037* (2013.01); *H04N 1/00076* (2013.01); *G06T 2207/30144* (2013.01)

(58) Field of Classification Search
    USPC .......................................................... 358/1.9
    See application file for complete search history.

(56) References Cited

FOREIGN PATENT DOCUMENTS

| | | |
|---|---|---|
| JP | 200717214 A | 1/2007 |
| JP | 2012-103225 A | 5/2012 |
| JP | 2013255216 A | 12/2013 |
| JP | 2018179699 A | 11/2018 |

OTHER PUBLICATIONS

Written Opinion of the International Searching Authority dated Jun. 2, 2020, in International Application No. PCT/JP2020/008728.
International Search Report dated Jun. 2, 2020, in International Application No. PCT/JP2020/008728.

* cited by examiner

INSPECTION METHOD, PROGRAM, INSPECTION DEVICE, AND PRINTING DEVICE

CROSS-REFERENCE TO RELATED APPLICATIONS

The present application is a Continuation of PCT International Application No. PCT/JP2020/008728 filed on Mar. 2, 2020 claiming priority under 35 U.S.C § 119(a) to Japanese Patent Application No. 2020-038681 filed on Mar. 4, 2019. Each of the above applications is hereby expressly incorporated by reference, in its entirety, into the present application.

BACKGROUND OF THE INVENTION

1. Field of the Invention

The present invention relates to an inspection method, a program, an inspection device, and a printing device, and particularly relates to inspection of a printed article.

2. Description of the Related Art

A defect inspection device that images an inspection target by using an imaging device such as a scanner, acquires imaging data of the inspection target, compares a reference image which is a reference with the imaging data of the inspection target, and determines the presence or absence of a defect of the inspection target based on the comparison result has been known.

As an application of defect inspection to which the defect inspection device is applied, an inspection device that inspects a printing defect such as a stripe and ink missing of a printed article which is printed by using a printing device has been put into practical use.

JP2012-103225A discloses an inspection device that inspects the print quality of a printed article by using a read image of a printed surface. The device disclosed in JP2012-103225A acquires an image obtained by ripping input image data as a reference image. The device analyzes the flatness indicating the change in a pixel value of the reference image, and switches a threshold value for inspection for each type of image region based on the flatness. The device compares the reference image and the inspection target image, determines whether or not the difference between the pixel values thereof exceeds the threshold value, and inspects the defect on the printed surface based on the determination result.

That is, in this device, a flat region in which the change in pixel value is relatively small is defined as a background region, and a region in which the change in pixel value is relatively large is defined as an edge region such as an outline and a pattern region, a non-printed portion is defined as a paper white region, and the threshold value for inspection is set for each region. As a result, the inspection performance is improved.

SUMMARY OF THE INVENTION

In a case in which a transparent medium used for a label or the like is used as the substrate for a printed article, the opposite side of the transparent medium is transparently imaged in a case in which a non-printing substrate region on which printing is not performed is imaged. Further, in a case in which a material such as leather is used as the substrate, the ground color pattern of the material itself is imaged in a case in which the substrate region is imaged. Then, due to the background of the substrate and the ground color pattern of the substrate itself, there is a concern that the pixel value at the position of the non-printing region in the imaging data corresponding to the substrate region of the printed article may be different each time the imaging is performed.

In a case in which a special substrate such as the transparent medium is used, a special color ink such as a white ink is printed as a base background color of a process color ink used for a pattern such as a cyan ink, a magenta ink, a yellow ink, and a black ink. Some of the functional inks and the process colors may be applied to the base background color.

In the inspection of a print defect in the related art, it is premised that a paper medium having a white ground color is the substrate, and it is premised that the printed article generated by using the process color is the inspection target. For example, it is premised that the defect inspection of the printed article in which a solid image using a white ink or the like is printed on the transparent substrate as a background and a pattern using the process color is printed on the background is performed.

A case in which the printed article is imaged in a case in which the printed article passes over a black substrate support member, the imaging data is analyzed, the defect inspection is performed is considered. In a case in which missing of the process color ink occurs, white appears in the imaging data in the region on which the background of a white ink is printed under the process color.

On the other hand, in a case in which the background of a white ink is not printed under the process color, black of the substrate support member appears in the imaging data. In the defect inspection in the related art, it is difficult to uniformly inspect such two or more types of defects.

In the invention disclosed in JP2012-103225A, the above technical problems are not focused on. Moreover, JP2012-103225A does not disclose the technique for solving the above technical problems.

The present invention has been made in view of such circumstances, and is to provide an inspection method, a program, an inspection device, and a printing device capable of realizing a uniform inspection in a defect inspection of a printed article using a special substrate.

In order to achieve the above object, the aspects of the invention are provided as follows.

An inspection method according to a first aspect is an inspection method comprising an imaging data acquisition step of acquiring imaging data of a printed article using a special substrate, a non-printing region positional information acquisition step of acquiring information for specifying a position of a non-printing region in the imaging data, the non-printing region corresponding to a substrate region of the printed article on which a pattern and a background of the pattern are not printed, an inspection step of specifying the non-printing region based on the information for specifying the position of the non-printing region, analyzing the imaging data by applying a predetermined inspection rule, and performing an inspection of the printed article, and a notification step of performing a notification of an inspection result of the printed article and not performing a notification of an inspection result indicating that a defect is present in the substrate region of the printed article corresponding to the non-printing region.

According to the first aspect, for the substrate region on which an image and the background are not printed on the printed article, the notification of the inspection result indicating the occurrence of the image defect is not performed.

As a result, it is possible to suppress a false notification of the inspection result, that is, the notification of the inspection result indicating the occurrence of the image defect in the substrate region of the printed article.

As the special substrate, at least any of a substrate having a ground color other than white or a transparent substrate can be applied. As the material of the substrate, paper, resin, metal, and fiber can be applied.

According to a second aspect, the inspection method of the first aspect may further comprise a pattern positional information acquisition step of acquiring information for specifying a position of a pattern region in the imaging data, the pattern region corresponding to the pattern in the printed article, a background positional information acquisition step of acquiring information for specifying a position of a background region in the imaging data, the background region corresponding to the background in the printed article, and an inspection rule setting step of setting an inspection rule for each of the non-printing region in the imaging data, the pattern region in the imaging data, and the background region in the imaging data and setting a different inspection rule for the non-printing region in the imaging data from those for the pattern region in the imaging data and the background region in the imaging data.

According to the second aspect, for the non-printing region in the imaging data, a different inspection rule from those for the pattern region and the background region is set. As a result, the inspection rule suitable for the non-printing region can be applied to the non-printing region.

The inspection rule is a comprehensive concept of an inspection procedure, an inspection algorithm, an inspection parameter, and an inspection threshold value.

According to a third aspect, in the inspection method of the second aspect, in the non-printing region positional information acquisition step, mask information on the non-printing region in the imaging data may be generated from information on a print position of the background, and the position of the non-printing region in the imaging data may be specified based on the mask information.

According to the third aspect, the non-printing region in the imaging data can be specified based on the print position of the background in the printed article.

According to a fourth aspect, in the inspection method of the third aspect, in the background positional information acquisition step, the position of the background region in the imaging data may be specified from information on a print position of a color applied to the background.

According to the fourth aspect, the position of the background region in the imaging data can be specified based on the print position of the color applied to the background of the printed article.

According to a fifth aspect, in the inspection method of the second aspect, in the non-printing region positional information acquisition step, mask information on the non-printing region in the imaging data may be generated from information on a print position of the background and information on a print position of the pattern, and the position of the non-printing region in the imaging data may be specified based on the mask information.

According to the fifth aspect, the non-printing region in the imaging data can be specified based on the information on the print position of the background in the printed article and the print position of the pattern in the printed article.

According to a sixth aspect, in the inspection method of the fifth aspect, in the background positional information acquisition step, the position of the background region in the imaging data may be specified from information on a print position of a color applied to the background, and in the pattern positional information acquisition step, the position of the pattern region in the imaging data may be specified from information on a print position of a color applied to the pattern.

According to the sixth aspect, the position of the background region in the imaging data can be specified based on the print position of the color applied to the background of the printed article. Further, the position of the pattern region in the imaging data can be specified based on the print position of the color applied to the pattern of the printed article.

According to a seventh aspect, in the inspection method of any one of the second to sixth aspects, in the pattern positional information acquisition step, a position of the pattern in the printed article may be specified from input image data of the printed article, and the position of the pattern region in the imaging data may be specified based on the position of the pattern in the printed article.

According to the seventh aspect, the position of the pattern region in the imaging data can be specified from the input image data of the printed article.

According to an eighth aspect, in the inspection method of any one of the second to seventh aspects, in the background positional information acquisition step, a position of the background in the printed article may be specified from input image data of the printed article, and the position of the background region in the imaging data may be specified based on the position of the background in the printed article.

According to the eighth aspect, the position of the background region in the imaging data can be specified from the input image data of the printed article.

According to a ninth aspect, in the inspection method of any one of the second to eighth aspects, in the non-printing region positional information acquisition step, a position of the background in the printed article may be specified from input image data of the printed article, and the position of the non-printing region in the imaging data may be specified based on the position of the background in the printed article.

According to the ninth aspect, the position of the non-printing region in the imaging data can be specified from the input image data of the printed article.

According to a tenth aspect, in the inspection method of any one of the second to eighth aspects, in the non-printing region positional information acquisition step, a position of the pattern in the printed article and a position of the background in the printed article may be specified from input image data of the printed article, and the position of the non-printing region in the imaging data may be specified based on the position of the pattern in the printed article and the position of the background in the printed article.

According to the tenth aspect, the position of the non-printing region in the imaging data can be specified from the input image data of the printed article.

According to an eleventh aspect, in the inspection method of any one of the second to tenth aspects, in the inspection step, an inspection of the non-printing region in the imaging data may not be performed.

According to the eleventh aspect, the inspection result of the non-printing region in the imaging data cannot be obtained. As a result, it is possible to suppress a notification of false detection that the defect occurs in the non-printing region in the imaging data.

According to a twelfth aspect, in the inspection method of any one of the second to tenth aspects, in the inspection rule setting step, an inspection algorithm may be set for each of the non-printing region in the imaging data, the pattern region in the imaging data, and the background region in the imaging data.

According to the twelfth aspect, the inspection algorithm suitable for each of the non-printing region, the pattern region, and the background region is set.

According to a thirteenth aspect, in the inspection method of the twelfth aspect, in the inspection rule setting step, in a case in which the defect occurs in the printed article, an algorithm for detecting a region in which a pixel value of the imaging data decreases as compared with a case in which the defect does not occur in the printed article may be set or an algorithm for detecting a region in which the pixel value of the imaging data increases as compared with a case in which the defect does not occur in the printed article may be set.

According to the thirteenth aspect, it is possible to uniformly inspect the occurrence of the defect in which the pixel value of the imaging data increases and the occurrence of the defect in which the pixel value of the imaging data decreases.

According to a fourteenth aspect, in the inspection method of the twelfth or thirteenth aspect, in the inspection rule setting step, an inspection threshold value may be set.

According to the fourteenth aspect, the inspection threshold value can be set for each region of the imaging data.

According to a fifteenth aspect, in the inspection method of any one of the twelfth to fourteenth aspects, in the inspection rule setting step, it may be set whether to perform or not to perform the inspection.

According to the fifteenth aspect, it can be set whether to perform or not to perform the inspection for each region of the imaging data.

According to a sixteenth aspect, in the inspection method according to any one of the first to fifteenth aspects, the special substrate may include a transparent substrate.

According to the sixteenth aspect, in a case in which the printed article using the transparent substrate is inspected, it is possible to suppress the false notification of the inspection result, that is, the notification of the inspection result indicating the occurrence of the image defect in the substrate region.

According to a seventeenth aspect, in the inspection method according to any one of the first to sixteenth aspects, a white ink may be applied to the background of the pattern.

According to the seventeenth aspect, in a case in which the printed article in which white is applied to the background is inspected, it is possible to suppress the false notification of the inspection result, that is, the notification of the inspection result indicating the occurrence of the image defect in the substrate region of the printed article.

According to an eighteenth aspect, in the inspection method according to any one of the first to seventeenth aspects, the printed article may be printed by applying an ink jet type printing device.

According to the eighteenth aspect, in a case in which the printed article which is printed by applying the ink jet type printing device is inspected, it is possible to suppress the false notification of the inspection result, that is, the notification of the inspection result indicating the occurrence of the image defect in the substrate region of the printed article.

A program according to a nineteenth aspect is a program that causes a computer to realize an imaging data acquisition function of acquiring imaging data of a printed article using a special substrate, a non-printing region positional information acquisition function of acquiring information for specifying a position of a non-printing region in the imaging data, the non-printing region corresponding to a substrate region of the printed article on which a pattern and a background of the pattern are not printed, an inspection function of specifying the non-printing region based on the information for specifying the position of the non-printing region, analyzing the imaging data by applying a predetermined inspection rule, and performing an inspection of the printed article, and a notification function of performing a notification of an inspection result of the printed article and not performing a notification of an inspection result indicating that a defect is present in the substrate region of the printed article corresponding to the non-printing region.

According to the nineteenth aspect, the same effects as those of the first aspect can be obtained.

In the nineteenth aspect, the same matters as those specified in the second to eighteenth aspects can be appropriately combined. In this case, the component responsible for the processing or function specified in the inspection method can be grasped as the component of the program responsible for the corresponding processing or function.

An inspection device according to a twentieth aspect is an inspection device comprising an imaging data acquisition unit that acquires imaging data of a printed article using a special substrate, a non-printing region positional information acquisition unit that acquires information for specifying a position of a non-printing region in the imaging data, the non-printing region corresponding to a substrate region of the printed article on which a pattern and a background of the pattern are not printed, an inspection unit that specifies the non-printing region based on the information for specifying the position of the non-printing region, analyzes the imaging data by applying a predetermined inspection rule, and performs an inspection of the printed article, and a notification unit that performs a notification an inspection result of the printed article, the notification unit not performing a notification of an inspection result indicating that a defect is present in the substrate region of the printed article corresponding to the non-printing region.

According to the twentieth aspect, the same effects as those of the first aspect can be obtained.

In the twentieth aspect, the same matters as those specified in the second to eighteenth aspects can be appropriately combined. In this case, the component responsible for the processing or function specified in the inspection method can be grasped as the component of the inspection device responsible for the corresponding processing or function.

A printing device according to a twenty-first aspect is a printing device comprising a printing unit that performs printing on a special substrate, and an inspection device that inspects a printed article generated by using the printing unit, in which the inspection device includes an imaging data acquisition unit that acquires imaging data of the printed article, a non-printing region positional information acquisition unit that acquires information for specifying a position of a non-printing region in the imaging data, the non-printing region corresponding to a substrate region of the printed article on which a pattern and a background of the pattern are not printed, an inspection unit that specifies the non-printing region based on the information for specifying the position of the non-printing region, analyzes the imaging data by applying a predetermined inspection rule, and performs an inspection of the printed article, and a notification unit that performs a notification of an inspection result of the printed article, the notification unit not performing a notification of an inspection result indicating that a defect is present in the substrate region of the printed article corresponding to the non-printing region.

According to the twenty-first aspect, the same effects as those of the first aspect can be obtained.

In the twenty-first aspect, the same matters as those specified in the second to eighteenth aspects can be appropriately combined. In this case, the component responsible for the processing or function specified in the inspection method can be grasped as the component of the printing device responsible for the corresponding processing or function.

According to the present invention, for the substrate region in the printed article on which the image and the background are not printed, the notification of the inspection result indicating the occurrence of the image defect is not performed. As a result, it is possible to suppress a false notification of the inspection result, that is, the notification of the inspection result indicating the occurrence of the image defect in the substrate region of the printed article.

DESCRIPTION OF THE PREFERRED EMBODIMENTS

Figure 1:
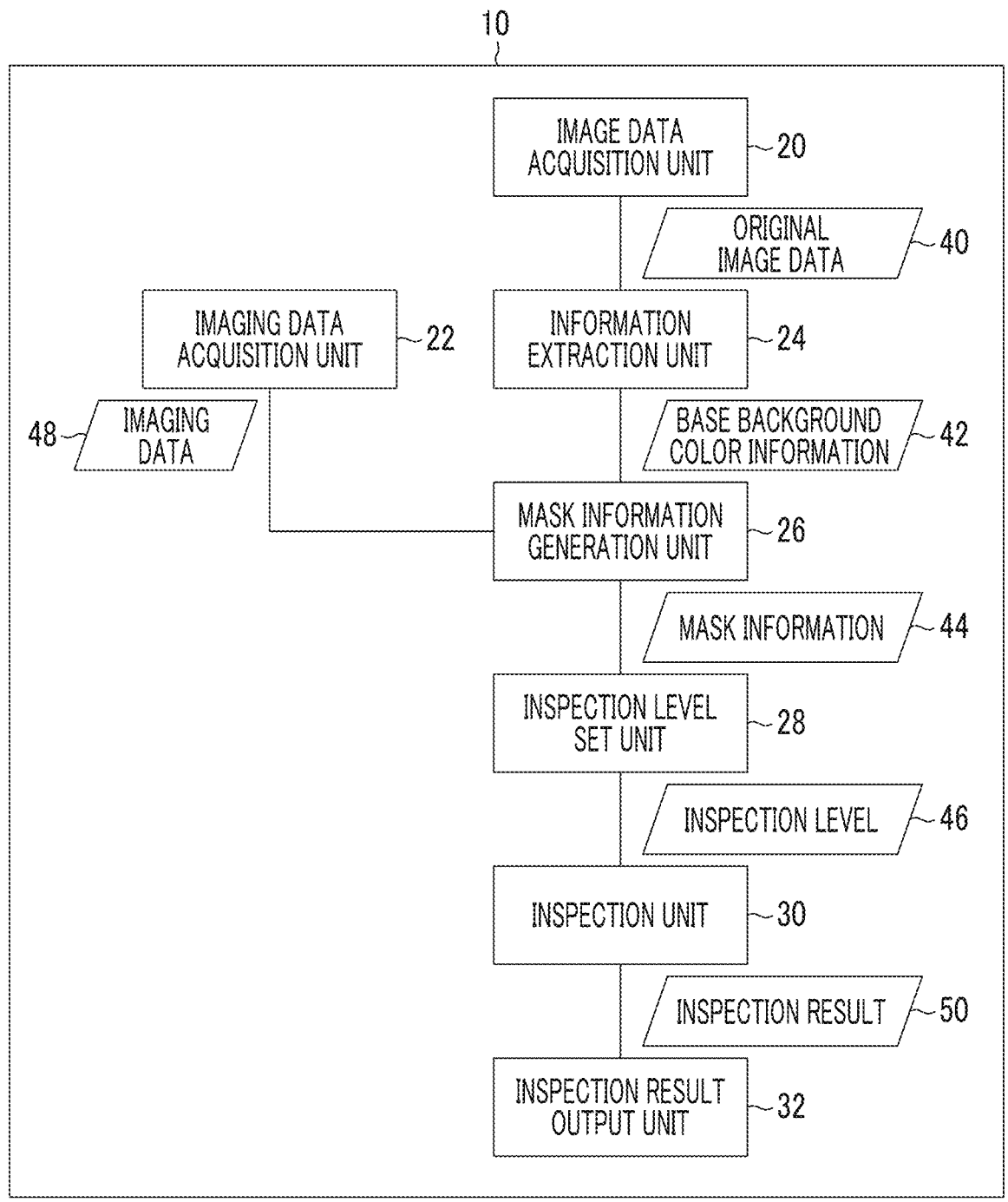
FIG. 1 is a functional block diagram of an inspection device according to an embodiment.

Preferred embodiment of the present invention will be described below in detail with reference to the accompanying drawings. In the present specification, the same components are designated by the same reference numerals, and duplicate description will be appropriately omitted.

[Configuration of Inspection Device]
[Overview]

FIG. 1 is a functional block diagram of an inspection device according to an embodiment. An inspection device 10 shown in the present embodiment is a defect inspection device for a printed article to which a special substrate is applied. The inspection device 10 performs a defect inspection suitable for a substrate region in the printed article on which a background is not printed.

The inspection device 10 acquires imaging data obtained by imaging the printed article by using an imaging device such as a scanner. The inspection device 10 generates mask information applied to divide, in the imaging data, the background region on which a base background color is printed and a non-printing region on which the base background color is not printed based on print positional information on the base background color.

The inspection device 10 specifies a position of the background region and a position of the non-printing region in the imaging data by using the mask information, and sets an inspection rule for each of the background region and the non-printing region in the imaging data. The inspection device 10 applies the inspection rule set for each of the background region and the non-printing region in the imaging data to determine the presence or absence of the defect in the background region and the non-printing region in the imaging data.

As the special substrate, a medium other than a paper medium having a white ground color can be applied. Examples of the special substrate include a transparent substrate and a substrate such as leather that has a rough texture and does not have a uniform color. Other examples of the special substrate include a colored paper having a ground color other than white, and a medium having a pattern, a design, or the like on the ground. That is, the special substrate indicates a medium in which a pixel value characteristic of the defect in the non-printing region in the imaging data is different from a pixel value characteristic of the defect in the other region in the imaging data in a case in which the defect occurs.

The special substrate may be in any of a single sheet form or a document form. As the material of the special substrate, paper, resin, metal, leather, cloth, wood, and the like can be applied.

In the present embodiment, the defect inspection of the printed article in which the image is formed on the transparent substrate by using the ink jet type printing device is described as an example. The image includes an ink adhering to the substrate based on input image data such as a pattern and a background.

The inspection device 10 comprises an image data acquisition unit 20, an imaging data acquisition unit 22, an information extraction unit 24, a mask information generation unit 26, an inspection level set unit 28, an inspection unit 30, and an inspection result output unit 32. Hereinafter, each unit will be described in detail.

[Image Data Acquisition Unit]

The image data acquisition unit 20 acquires original image data 40 to be input to the printing device in a case in which the printed article is printed. The original image data 40 includes color information on cyan, magenta, yellow, black, and white. The original image data 40 in the embodiment corresponds to an example of input image data.

That is, the background of the printed article is printed by using a white ink, and the pattern is printed on the background by using a process color ink including at least one color ink of a cyan ink, a magenta ink, a yellow ink, or a black ink. The pattern can include a character, a symbol, a figure, a line, and the like.

The inspection device 10 can comprise an image data storage unit that stores the original image data 40 acquired by using the image data acquisition unit 20. The image data storage unit is not shown. Hereinafter, cyan may be described as C, magenta may be described as M, yellow may be described as Y, black may be described as K, and white may be described as W.

[Imaging Data Acquisition Unit]

The imaging data acquisition unit 22 acquires imaging data 48 of the printed article read by using the imaging device such as the scanner. The imaging data acquisition unit 22 may acquire the imaging data 48 of the printed article from the imaging device such as the scanner, may acquire the imaging data 48 of the printed article via a network or the like, or may acquire the imaging data 48 of the printed article from an information storage medium such as a memory card.

The inspection device 10 can comprise an imaging data storage unit that stores the imaging data 48 acquired by using the imaging data acquisition unit 22. The imaging data storage unit may be configured integrally with the image data storage unit. The imaging data storage unit is not shown.

[Information Extraction Unit]

The information extraction unit 24 extracts base background color information 42 indicating the print position of the base background color, which is the basis of positional information on the substrate region in the original image data 40, from the original image data. That is, the information extraction unit 24 extracts information on the ink color plate applied to the base background color from the ink color plates applied to the printing device. The information extraction unit 24 stores the base background color information 42 in a determined storage unit.

In the present embodiment, white is applied to the base background color. The information extraction unit 24 extracts white plate information and uses the print position of a white ink to specify the print position of the background in the original image data.

[Mask Information Generation Unit]

The mask information generation unit 26 uses the information on the print position of the background in the original image data 40 to generate mask information 44 for specifying the position of the non-printing region in the imaging data. The mask information generation unit 26 stores the mask information 44 in a determined storage unit.

The mask information generation unit 26 enlarges or reduces the white plate information to a size that matches the imaging data 48, and aligns a reference position of the white plate with a reference position of the imaging data 48. The mask information generation unit 26 generates a mask image as mask information 44, which is divided into the background region on which a white ink is printed and the non-printing region on which a white ink is not printed based on the white plate information. As an example of the mask image, there is an example in which a pixel value in the non-printing region is replaced with a fixed value. Examples of the pixel value of a fixed value include the maximum value of the pixel value or the minimum value of the pixel value.

The mask information generation unit 26 can generate pattern mask information for specifying the position of the pattern region in the imaging data 48 by using the information on the print position of the process color. That is, the mask information generation unit 26 can generate the pattern mask information for specifying the position of the pattern region by performing the same processing as the white plate on each color plate of the process color.

The mask information generation unit 26 may generate the mask information 44 for specifying the position of the non-printing region in the imaging data by using background mask information generated by using the information on the print position of the background in the original image data 40 and pattern mask information generated by using the information on the print position of the pattern in the original image data 40. The mask information generation unit 26 in the embodiment corresponds to an example of a non-printing region positional information acquisition unit.

[Inspection Level Set Unit]

The inspection level set unit 28 divides, in the imaging data 48, the background region and the non-printing region based on the imaging data 48 and the mask information 44. The inspection level set unit 28 sets an inspection level 46 in each region. The inspection level set unit 28 can associate the inspection level 46 set in each region with each region and store the associated inspection level in a determined storage unit. The inspection level 46 in the embodiment corresponds to an example of an inspection rule.

That is, the inspection level set unit 28 sets the inspection rule for performing a standard defect inspection in the background region on which a white ink is printed. On the other hand, the inspection level set unit 28 sets the inspection rule for the non-printing region on which a white ink is not printed to improve the false detection avoidance performance and decrease the correct detection performance as compared with the standard defect inspection, and the false detection indicating the occurrence of the defect in the non-printing region is avoided.

The inspection level set unit 28 sets the inspection rule for the pattern region of the imaging data to improve the false detection avoidance performance and decrease the correct detection performance as compared with the standard defect inspection, and the false detection in the pattern region can be avoided. The pattern on the printed article may include a shape or the like that is likely to be misrecognized as a stripe. Therefore, for the pattern region, the inspection rule is set to improve the false detection avoidance performance and decrease the correct detection performance as compared with the standard defect inspection.

[Inspection Unit]

The inspection unit 30 performs the defect inspection of the printed article based on the inspection level 46 for each region set by using the inspection level set unit 28. The inspection unit 30 stores an inspection result 50 for each region in a determined storage unit.

[Inspection Result Output Unit]

The inspection result output unit 32 outputs the inspection result 50 of the printed article, which is performed by the inspection unit 30. As the output mode of the inspection result 50, display of the inspection result 50 by using a monitor device or the like, printing of the inspection result 50 by using the printing device, and output of a voice indicating the inspection result 50 to which voice information is applied by using a speaker or the like can be applied.

The inspection result output unit 32 does not output the inspection result 50 indicating the occurrence of the image defect in the substrate region of the printed article in a case in which the inspection result 50 indicating the occurrence of the image defect in the substrate region of the printed article is obtained. The non-output in the embodiment corresponds to an example of non-notification.

The inspection result output unit 32 may output the inspection result 50 indicating no occurrence of the image defect in the substrate region of the printed article in a case in which the inspection result 50 indicating no occurrence of the image defect in the substrate region of the printed article is obtained. The inspection result output unit 32 may output character information or the like indicating that the inspection result 50 of the substrate region of the printed article is not output. The inspection result output unit 32 in the embodiment corresponds to an example of a notification unit.

[Flowchart of Inspection Method]

Figure 2:
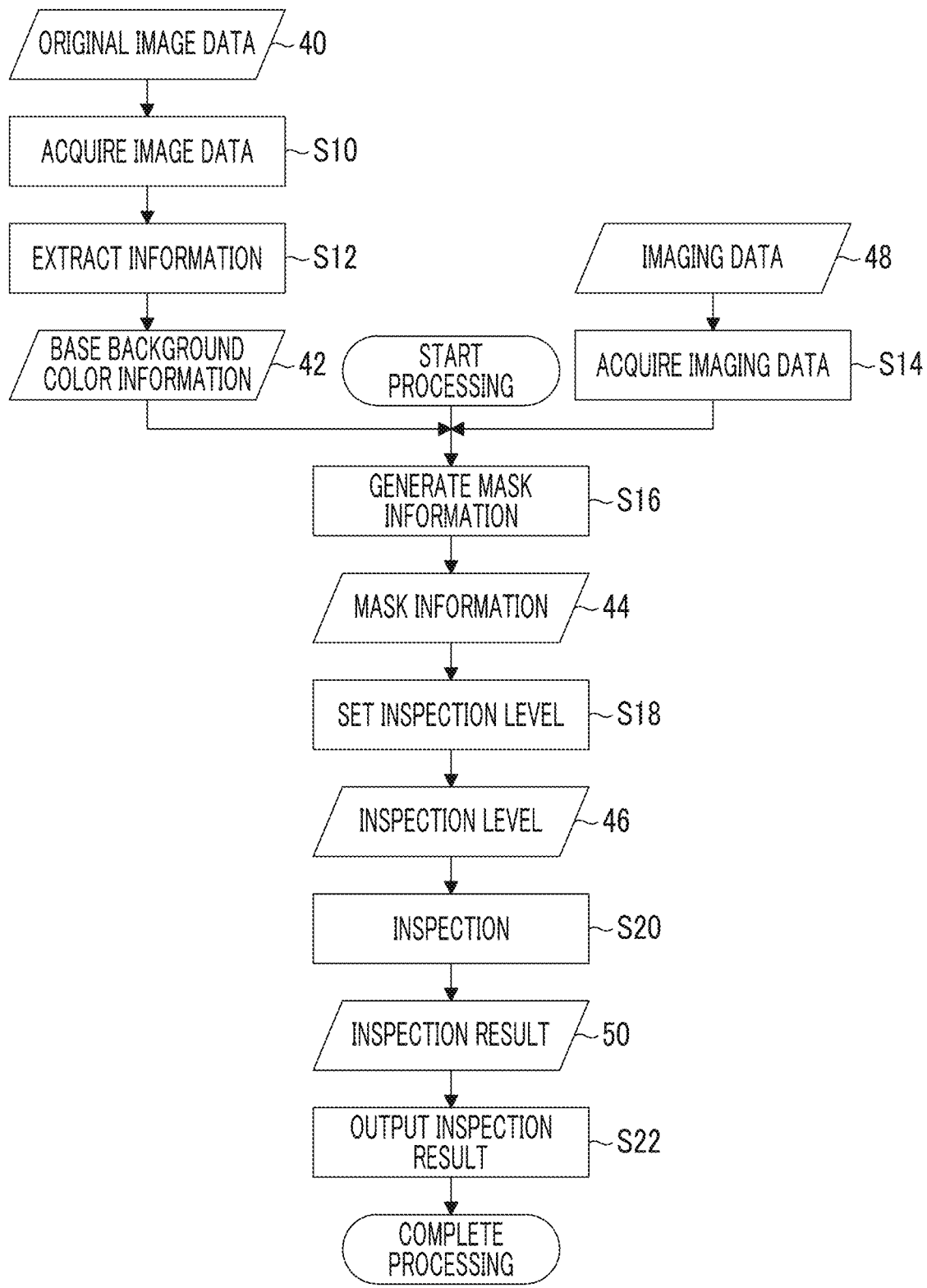
FIG. 2 is a flowchart showing a procedure of an inspection method according to the embodiment.

FIG. 2 is a flowchart showing a procedure of an inspection method according to the embodiment. The inspection method according to the present embodiment includes an image data acquisition step S10, an information extraction step S12, an imaging data acquisition step S14, a mask information generation step S16, an inspection level setting step S18, an inspection step S20, and an inspection result output step S22.

In the image data acquisition step S10, the image data acquisition unit 20 shown in FIG. 1 acquires the original image data 40. After the image data acquisition step S10, the process proceeds to the information extraction step S12. In the information extraction step S12, the information extraction unit 24 extracts the base background color information 42, which is the plate information on the base background color, from the original image data 40, and specifies the print position of the background in the original image data 40. After the information extraction step S12, the process proceeds to the mask information generation step S16.

In the imaging data acquisition step S14, the imaging data acquisition unit 22 acquires the imaging data 48 of the printed article. After the imaging data acquisition step S14, the process proceeds to the mask information generation step S16. That is, after the original image data 40 and the imaging data 48 are acquired, the process proceeds to the mask information generation step S16.

In the mask information generation step S16, the mask information generation unit 26 uses the information on the print position of the background in the original image data 40 to generate mask information 44 for specifying the position of the non-printing region in the imaging data 48. After the mask information generation step S16, the process proceeds to the inspection level setting step S18. The mask information generation step S16 corresponds to an example of a non-printing region positional information acquisition step.

In the mask information generation step S16, the pattern mask information for specifying the position of the pattern region in the imaging data 48 can be generated. In the mask information generation step S16, the background mask information for specifying the position of the background region in the imaging data 48 can be generated.

The mask information generation step S16 in the embodiment corresponds to an example of a pattern positional information acquisition step. Also, the mask information generation step S16 in the embodiment corresponds to an example of a background positional information acquisition step.

In the inspection level setting step S18, the inspection level set unit 28 sets the inspection level 46 of the non-printing region in the imaging data 48. After the inspection level setting step S18, the process proceeds to the inspection step S20. The inspection level setting step S18 in the embodiment corresponds to an example of an inspection rule setting step. Also, the inspection level 46 shown in FIG. 2 can include an inspection level of the background region and an inspection level of the pattern region.

In the inspection step S20, the inspection unit 30 performs the inspection of the imaging data 48 of the printed article based on a determined inspection level. After the inspection step S20, the process proceeds to the inspection result output step S22.

In the inspection result output step S22, the inspection result output unit 32 outputs the inspection result 50. After the inspection result is output, the inspection device 10 completes the defect inspection of the printed article. The inspection result output step S22 in the embodiment corresponds to an example of a notification step.

[Specific Example of Printed Image]

Figure 3:
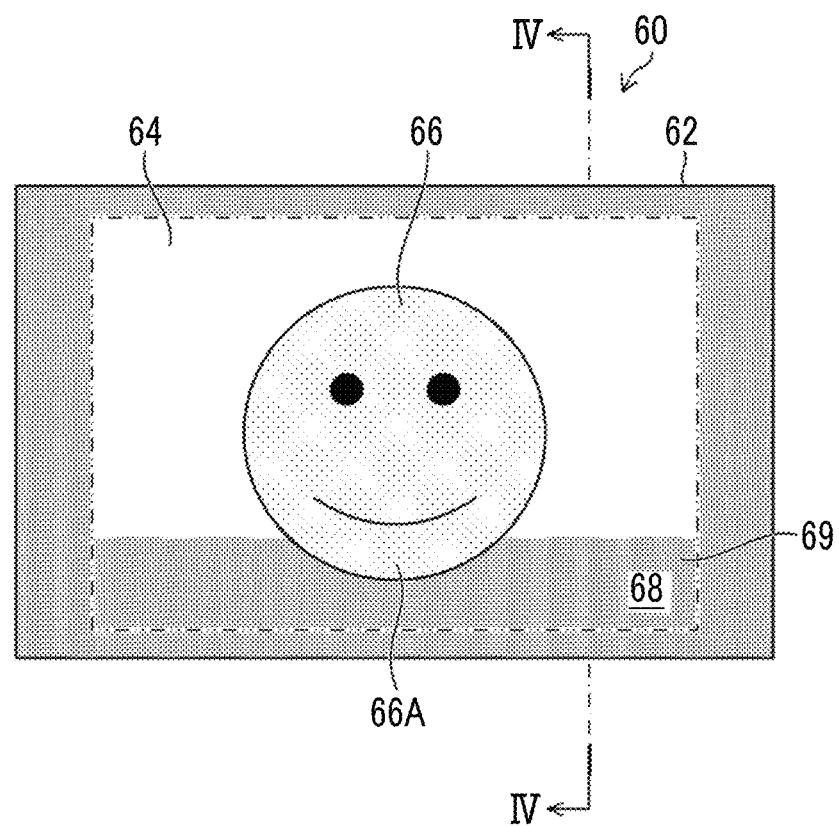
FIG. 3 is a schematic view of a printed article.
Figure 4:
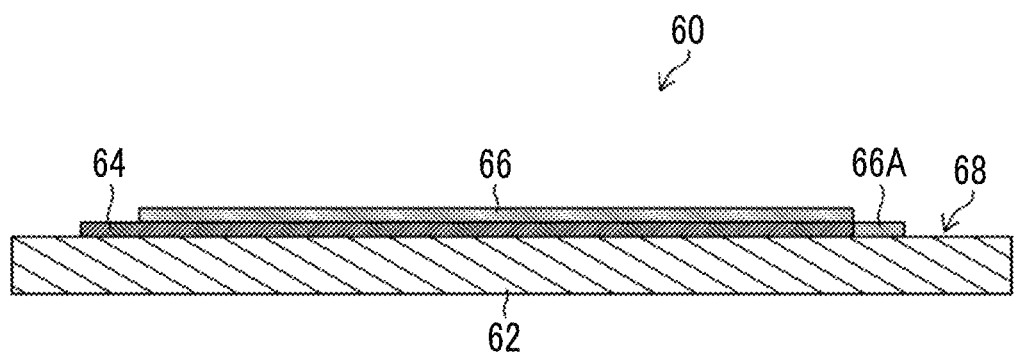
FIG. 4 is a cross-sectional view taken along the IV-IV cross-sectional line of the printed article shown in FIG. 3.

FIG. 3 is a schematic view of the printed article. FIG. 4 is a cross-sectional view taken along the IV-IV cross-sectional line of the printed article shown in FIG. 3. In a printed article 60 applied to the present embodiment, a background 64 is printed on a transparent substrate 62 by using a white ink, and a pattern 66 is printed on the background 64.

A part 66A of the pattern 66 of the printed article 60 is printed on a substrate region 68 on which the background 64 is not printed. That is, the printed article 60 is divided into the substrate region 68, a region on which only the background 64 is printed, a region in which the pattern 66 is printed on the background 64, and a region on which only the pattern 66 is printed. The region inside the two dot chain line is a printable region 69 in the transparent substrate 62. The printable region 69 is not shown in FIG. 4.

[Modification Example of Printed Image]

Figure 5:
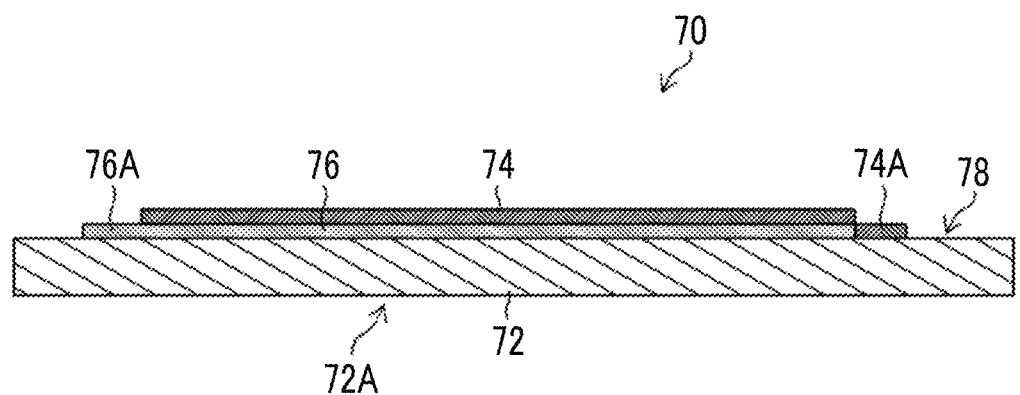
FIG. 5 is a cross-sectional view of a printed article according to a modification example.

FIG. 5 is a cross-sectional view of a printed article according to a modification example. In a printed article 70 shown in FIG. 5, a pattern 76 is printed on a transparent substrate 72, and a background 74 is printed on a pattern 76. Reference numeral 74A indicates a part of the background printed on the substrate region 78. Further, the background 74 is not printed on a part 76A of the pattern 76.

In a case in which the printed article 70 is viewed from a non-printed surface 72A side of the transparent substrate 72, the pattern 76 can be correctly visually recognized. The printed article 70 is subjected to the defect inspection based on the imaging data obtained by reading the non-printed surface 72A side of the transparent substrate 72 by using the imaging device.

[Specific Example of Inspection Level]

[Setting Example of Inspection Level for Each Region]

Figure 6:
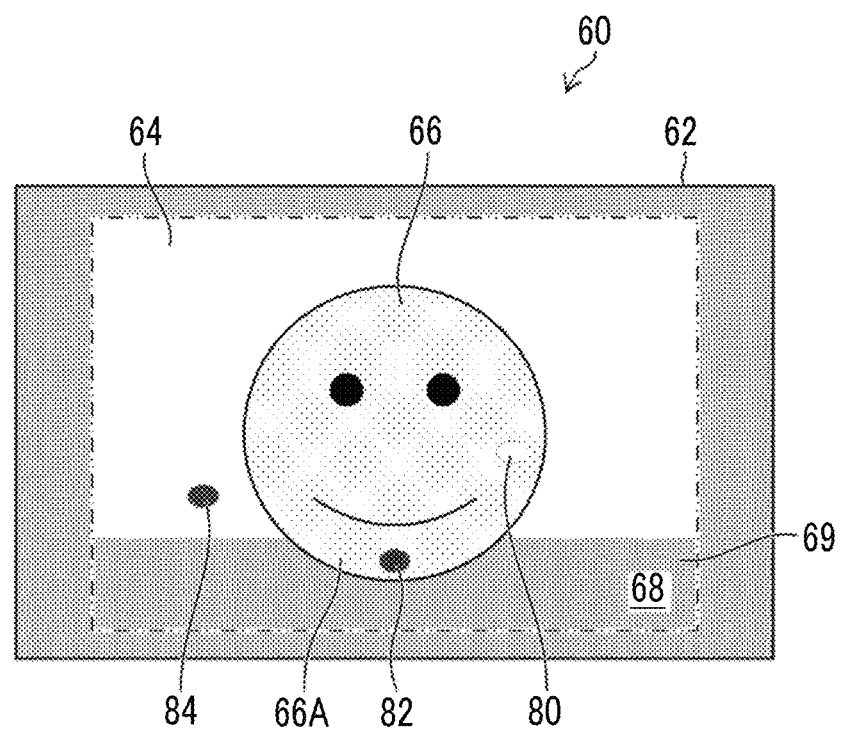
FIG. 6 is an explanatory diagram of inspection level setting.

FIG. 6 is an explanatory diagram of inspection level setting. In the printed article 60 shown in FIG. 6, the background 64 is printed on the transparent substrate 62 by using a white ink, and the pattern 66 is printed by using a cyan ink, a magenta ink, a yellow ink, and a black ink. Further, the printed article 60 is printed by using the ink jet type printing device.

In a case in which the printed article 60 passes through a black substrate support unit (not shown), the printed article 60 is imaged by using the imaging device (not shown), and the imaging data of the printed article 60 is generated. The printed article 60 is subjected to the defect inspection in which the inspection of the ink missing is performed by using the imaging data.

In the defect inspection of the printed article 60, the pixel value characteristic in the imaging data is different between the ink missing defect which occurs in a white ink and the ink missing defect which occurs in a cyan ink or the like. In a case in which the pattern 66 is printed on the background 64, a defect 80 in the pattern 66 is white. Then, the pixel value of the corresponding pixels of the defect 80 in the imaging data changes in an increasing tendency as compared with the corresponding pixels in a normal position.

On the other hand, it is assumed that a defect 82 occurs in the part 66A of the pattern 66 printed on the substrate region 68 on which the background 64 is not printed. The defect 82 in the part 66A of the pattern 66 allows the color of the support surface of the transparent substrate 62 to show through. Then, in a case in which the color of the support surface of the transparent substrate 62 is black, the pixel value of the corresponding pixels of the defect 82 in the imaging data changes in a decreasing tendency as compared with the corresponding pixels in the normal position.

It is assumed that a defect 84 occurs in the background 64. Similar to the case in which the part 66A of the pattern 66 is printed on the substrate region 68, the defect 84 in the background 64 allows the color of the support surface of the transparent substrate 62 to show through. In a case in which the color of the support surface of the transparent substrate 62 is black, the pixel value of the corresponding pixels of the defect 84 in the imaging data changes in a decreasing tendency as compared with the corresponding pixels in the normal position.

In a case in which the defect 80 in the pattern 66 printed on the background 64 is found, the inspection rule for finding the region in which the pixel value of the imaging data changes in the increasing tendency is applied. On the other hand, in a case in which the defect 82 in the part 66A of the pattern 66 printed on the substrate region 68 and the defect 84 in the background 64 are found, the inspection rule for finding the region in which the pixel value of the imaging data changes in the decreasing tendency is applied.

The pattern 66 has more edges as compared with the background 64 and the like, and thus the false detection that the edges are mistaken for the defect is likely to occur. On the other hand, the background 64 has relatively few edges and is flat as compared with the pattern 66 and the like, and thus the false detection that the edge is mistaken for the defect is unlikely to occur.

Therefore, in the background 64, a determination threshold value for whether or not the defect occurs is set to relatively decrease the false detection avoidance performance and relatively increase the correct detection performance as compared with the pattern 66. Stated another way, in the pattern 66, the determination threshold value for whether or not the defect occurs is set to relatively increase the false detection avoidance performance and relatively decrease the correct detection performance as compared with the background 64. As a result, it is possible to detect the fine defect in the background 64, and it is possible to avoid the false detection of the defect in the pattern 66.

The ink missing defect which occurs in a white ink in the embodiment corresponds to an example of a region in which the pixel value of the imaging data decreases in a case in which the defect occurs in the printed article as compared with a case in which the defect does not occur in the printed article. Further, the defect 82 occurring in the part 66A of the pattern 66 printed on the substrate region 68 on which the background 64 in the embodiment is not printed corresponds to an example of a region in which the pixel value of the imaging data increases as compared with a case in which the defect does not occur in the printed article. The determination threshold value in the embodiment corresponds to an example of an inspection threshold value.

[Setting of Performing or Not Performing of Inspection]

The inspection device and the inspection method according to the present embodiment can be set to perform the inspection or not to perform the inspection for each region. For example, the inspection rule can be applied in which the inspections of the background 64 and the pattern 66 are performed and the inspection of the substrate region 68 is not performed. This makes it possible to avoid occurrence of the risk of the false detection indicating the occurrence of the defect in the substrate region 68.

The ink during printing does not adhere to the substrate region 68. As a result, the substrate region 68 is supposed not to have any ink missing or stripe-like defect. Therefore, for the substrate region 68, uncleanliness on the transparent substrate 62 may be inspected and the inspection of the ink missing or the like may not be performed.

In the imaging of the printed article 60, for the substrate region 68, the transparent substrate 62 itself is read. It is difficult for the inspection unit 30 to distinguish the imaging data 48 from whether it is the defect or the transmission of the support surface of the transparent substrate 62. Then, there is a possibility that the transmission of the support surface of the transparent substrate 62 is frequently detected as the defect of the printed article 60.

Therefore, the inspection rule is set so that the inspection of the substrate region 68 is not performed. As a result, it is possible to avoid the false detection in which the transmission of the support surface of the transparent substrate 62 is detected as the defect in the printed article 60. As the setting of the inspection rule, the setting of the inspection algorithm, the setting of the inspection parameter, the setting of performing or not performing the inspection, and the like can be applied.

[Explanation of False Detection Avoidance Performance and Correct Detection Performance]

The accuracy of the defect inspection of the printed article is determined based on the correct detection performance and the false detection avoidance performance. The correct detection performance is the performance that correctly determines the defect as the defect. The false detection avoidance performance is a performance that does not mistakenly determine a non-defect, which is not the defect, as the defect.

In general, there is a trade-off between the correct detection performance and the false detection avoidance performance. In a case in which the correct detection performance increases, the false detection avoidance performance is likely to decrease. On the other hand, in a case in which the false detection avoidance performance increases, the correct detection performance is likely to decrease.

Whether the correct detection performance is prioritized over the false detection avoidance performance or the false detection avoidance performance is prioritized over the correct detection performance can be determined based on the printed article condition, the inspection condition, and the like. In the defect inspection in the present embodiment, in a case in which the inspection target region of the printed article is the substrate region, the inspection rule that gives priority to the false detection avoidance performance can be set.

[Operation and Effect]

According to the inspection device and the inspection method according to the present embodiment, the operations and effects can be obtained as follows.

[1]

In the defect inspection of the printed article 60 by using the imaging data 48 of the printed article 60, the inspection result indicating the occurrence of the defect in the substrate region 68 is not output. As a result, it is possible to avoid the false detection that outputs the inspection result indicating the occurrence of the defect in the substrate region 68 to which ink does not adhere in printing.

[2]

Based on the position of the background 64 in the original image data 40, the position of the substrate region 68 in the original image data 40 is specified, and the mask information 44 for specifying the position of the non-printing region in the imaging data 48 is generated. As a result, the non-printing region in the imaging data 48 can be specified based on the position of the background 64 of the original image data 40.

[3]

Based on the position of the background 64 and the pattern 66 in the original image data 40, the position of the substrate region 68 in the original image data 40 is specified, and the mask information for specifying the position of the non-printing region in the imaging data 48 is generated. As a result, the non-printing region in the imaging data 48 can be specified based on the position of the background 64 of the original image data 40 and the position of the pattern 66.

[4]

In the defect inspection of the substrate region 68 in the printed article 60, the false detection avoidance performance relatively increases and the correct detection performance relatively decreases. As a result, in the defect inspection of the printed article 60, it is possible to avoid the false detection indicating the occurrence of the defect in the substrate region 68.

[5]

The defect inspection is not performed for the substrate region 68 in the printed article 60. Therefore, in the defect inspection of the printed article 60, it is possible to avoid the false detection indicating the occurrence of the defect in the substrate region 68.

[6]

The inspection rule is set for each region in the printed article 60. As a result, it is possible to uniformly inspect the printed article 60 having a plurality of regions and having different pixel value characteristics for each region.

[Regarding Combination of Substrate and Base Background Color]

In the present embodiment, the transparent substrate 62 is described as an example of the special substrate, and white is described as an example of the base background color, but the combination of the special substrate and the base background color is not limited to these examples. For example, as the special substrate, a leather substrate, a metal substrate, a resin substrate, or the like may be applied, and as the base background color, white, black, or the like may be applied. The transparent substrate 62 need only have a fixed light transmission performance from one surface side to the other surface side.

As the special substrate, a paper medium having a ground color other than white and a paper medium on which a design is drawn can be applied. An example of the paper medium having the ground color other than white is a wrapping paper or the like on which a color such as red is printed. An example of the paper medium on which the design is drawn is a wrapping paper on which a logo mark of a department store or the like is printed.

Specific examples of the combination of the transparent substrate and the white base background color include label printing of a PET bottle. Specific examples of the combination of the leather substrate and the white base background color include printing a logo on a seat of a motorcycle.

As an example of using a white ink for the background 64, there is an example in which the color inks such as cyan, magenta, yellow, and black are used for the pattern 66 such that the color of the pattern 66 can be seen. As an example of using a black ink for the background 64, there is an example in which the process color inks such as cyan, magenta, and yellow, or the special color inks such as gold and silver are applied to the pattern 66 after a black ink is uniformly applied. Examples of printing the pattern 66 of the color ink on the black background 64 include printing of a pen case.

Any color combination can be applied to the color combination applied to the background 64 and the pattern 66, such as an example in which a magenta ink is applied to the background 64 and a yellow ink is applied to the pattern 66.

[Regarding Original Image Data]

In the present embodiment, the original image data 40 that forms an image using cyan, magenta, yellow, black, and white is described as an example, but the original image data 40 is not limited to the example shown in the present embodiment. For example, a color model obtained by adding transparency called alpha to the three colors of red, green, and blue called RGBA may be applied to the original image data 40.

Also, the original image data 40 may be a bitmap image obtained by performing raster image processing on the input image data of the printing device. Further, in a case in which background printing is performed as subsequent processing of pattern printing, in a case in which the original image data for pattern printing and the original image data for background printing are divided into a plurality of pieces of original image data, the plurality of pieces of original image data may be applied.

[Regarding Print Positional Information on Base Background Color]

In the present embodiment, the mask information on the non-printing region in the imaging data 48 is generated by applying white as the base background color and using the print position of a white ink in the original image data 40, but the color other than white can be applied as the base background color. For example, the mask information on the non-printing region in the imaging data 48 may be generated by applying black as the base background color and using the print position of the black ink in the original image data 40.

The base background color indicates color information on a coloring material mainly used for covering the printed surface of the substrate. The base background color may be applied to the entire printed surface of the substrate or may be applied to an outer region of the pattern 66.

In the present embodiment, information on the print position of one type of ink is applied as information on the print position of the base background color, but the information on a plurality of types of ink positions may be applied as the information on the print position of the base background color.

For example, in a case in which a striped pattern using a white ink and a black ink is applied to the base background color, information on the print position of a white ink and information on the print position of a black ink are generated, and both can be integrated to generate the information on the print position of the base background color.

Then, for the non-printing region in the imaging data 48 based on the information on the print position of a white ink, the inspection of a black dot-shaped defect may be performed, and for the non-printing region in the imaging data 48 based on the information on the print position of a black ink, the inspection of the white dot-shaped defect may be performed.

Other information may be added to the mask information applied to the imaging data generated by using the information on the print position of a white ink which is the base background color. Examples of other information include information on the print position of the ink applied to the pattern 66.

As shown in FIG. 3 and the like, the printed article 60 is classified into the substrate region 68 in which the background 64 and the pattern 66 are not printed, the background region in which only the background 64 is printed, the pattern region in which only the pattern 66 is printed, and the region in which both the background 64 and the pattern 66 are printed. In this way, the printed article 60 can be classified into a plurality of regions based on the printing condition, and the inspection rule suitable for the printing condition for each classification can be set for each classification.

[Regarding Information Extraction Processing]

In the present embodiment, the information on the print position of a white ink is extracted from the original image data 40 as the base background color information 42, but the information extraction processing is not limited to this example. In a case in which gray using a white ink and a black ink is applied as the base background color, the information indicated by the logical product of the information on the print position of a white ink and the information on the print position of a black ink may be extracted from the original image data 40.

Further, instead of the processing of extracting the base background color information 42 from the original image data 40, the imaging data 48 may be analyzed to specify the background region, the pattern region, and the non-printing region in the imaging data 48.

[Regarding Mask Information Generation Processing]

In mask information generation processing, in a case in which conversion processing is performed on the imaging data 48 in internal processing of the defect inspection, the mask information 44 matching the image or profile after the conversion processing may be generated. In the mask information generation processing, in a case in which the original image data 40 is input, the mask information 44 corresponding to the original image data 40 may be generated.

Further, by matching the format to the result output in the defect inspection processing, and the processing may be changed to processing such as deleting a part of the output result after the inspection.

[Regarding Mask Information]

In the present embodiment, the mask image is generated as the mask information 44, but mapping information on the start point and the end point for designating the area may be applied as the mask information 44. The vectors may be applied instead of the mapping information.

In the present embodiment, a binary image in which the printing region is defined as 0 and the non-printing region is defined as 1 is applied to the mask image, but a multi-value image or a multi-channel image may be applied to the mask image. For example, a multi-value image corresponding to the concentration of the base background color can be applied to the mask image. As a result, as the concentration value of the base background color increases, the correct detection performance can relatively increase, and the false detection avoidance performance can relatively decrease. Further, by matching the format to the result output in the defect inspection processing, and the processing may be changed to processing such as deleting a part of the output result after the inspection.

In the present embodiment, a mode in which one mask information 44 is generated is described as an example, but a plurality of pieces of the mask information 44 may be generated. For example, in a case in which the inspection of a plurality of the printed articles 60 in the imaging data 48 is performed in parallel, the inspection may be performed by using a plurality of inspection units 30, and different inspection processing may be performed for each inspection unit 30.

In such a mode, the conversion processing of the base background color information 42 extracted from the original image data 40 may be different for each inspection unit 30. Therefore, the mask information 44 suitable for the inspection processing for each inspection unit 30 may be generated for each inspection unit 30.

[Application Example to Program Invention]

It is possible to configure a program that causes a computer to realize the functions of each unit of the inspection device configured as described above and the functions of each step of the inspection method. In the present specification, a software is handled as synonymous with a program.

For example, the present specification discloses a program that causes the computer to realize an image data acquisition function, an imaging data acquisition function, an information extraction function, a mask information generation function, an inspection level setting function, an inspection function, and an inspection result notification function. The mask information generation function corresponds to an example of a non-printing region positional information acquisition function.

The original image data is acquired by the image data acquisition function. The imaging data of the printed article is acquired by the imaging data acquisition function. The information on the print position of the base background color is extracted from the original image data by the information extraction function.

The mask information for specifying the position of the non-printing region in the imaging data is generated from the information on the print position of the base background color by the mask information generation function. The inspection level is set for each region in the imaging data by the inspection level setting function. The inspection level is applied to perform the inspection of the printed article by the inspection function. The notification of inspection result indicating the occurrence of the defect in the substrate region of the printed article is not performed by the inspection result notification function in a case in which the notification of the inspection result of the printed article is performed.

[Combination of Embodiment and Modification Example]

The embodiment and the modification example which are described above can be appropriately combined without deviating from the gist of the present embodiment.

[Application Example to Ink Jet Printing Device]

Figure 7:
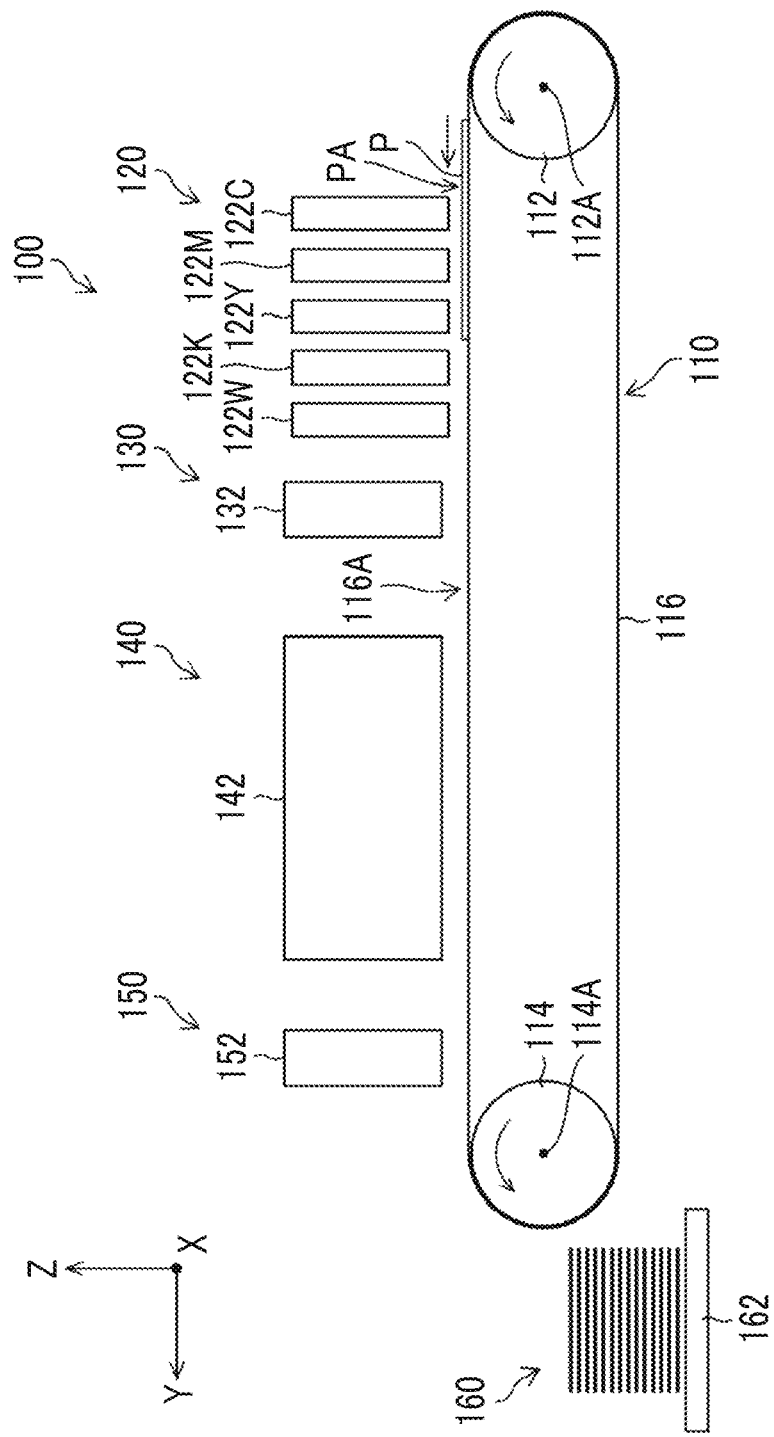
FIG. 7 is an overall configuration diagram of an ink jet printing device according to the embodiment.

An ink jet printing device 100 comprising the inspection device 10 described with reference to FIGS. 1 to 6 will be described. FIG. 7 is an overall configuration diagram of an ink jet printing device according to the embodiment. The ink jet printing device 100 shown in FIG. 7 is a printing device that prints a color image by jetting a cyan ink, a magenta ink, a yellow ink, a black ink, and a white ink onto a substrate P. The ink jet printing device 100 can use the special substrate as the substrate P.

The ink jet printing device 100 comprises a transport unit 110, a printing unit 120, an imaging unit 130, a dry unit 140, a sorting unit 150, and a paper discharge unit 160. Hereinafter, each unit will be described in detail.

[Transport Unit]

Figure 8:
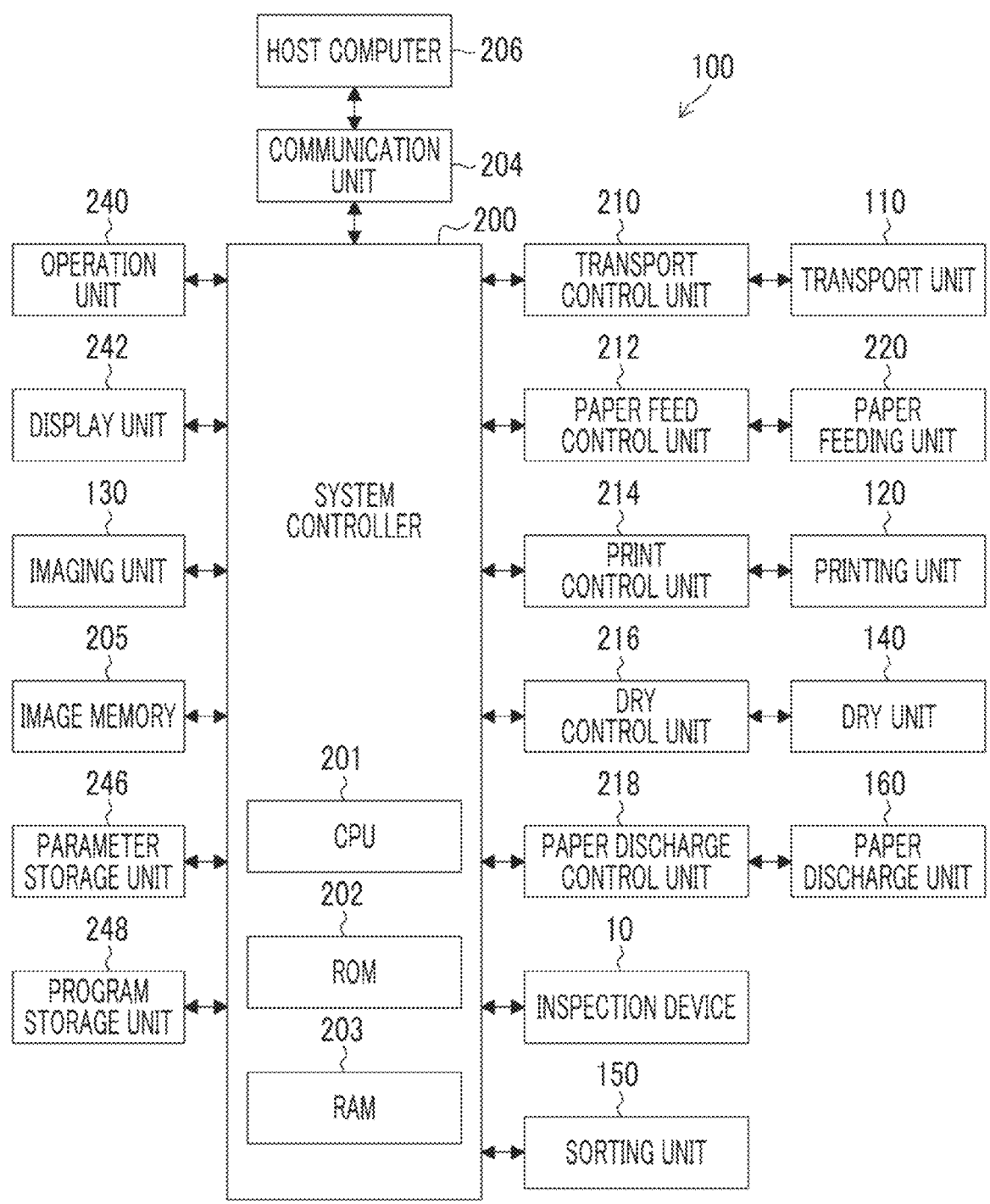
FIG. 8 is a functional block diagram of the ink jet printing device shown in FIG. 7.

The transport unit 110 transports the substrate P supplied from a paper feeding unit (not shown in FIG. 7) in a substrate transport direction. The reference numeral Y indicates the substrate transport direction. The reference numeral X indicates a width direction of the substrate, and the reference numeral Z indicates a vertical upward direction. The paper feeding unit is shown in FIG. 8 by using the reference numeral 220.

The transport unit 110 comprises an upstream pulley 112, a downstream pulley 114, and a transport belt 116. The upstream pulley 112 includes a rotating shaft 112A which extends in the width direction of the substrate, and the rotating shaft 112A is rotatably pivotally supported. The downstream pulley 114 includes a rotating shaft 114A parallel to the rotating shaft 112A of the upstream pulley 112, and the rotating shaft 114A is rotatably pivotally supported.

As the transport belt 116, a stainless steel endless belt can be applied. The transport belt 116 is bridged between the upstream pulley 112 and the downstream pulley 114. By using the stainless steel transport belt 116, the flatness of the substrate P can be kept well.

A rotating shaft of a motor (not shown) is connected to the rotating shaft 114A of the downstream pulley 114. In a case in which the motor is rotated in a determined rotation direction, the downstream pulley 114 rotates counterclockwise in FIG. 7. The upstream pulley 112 rotates counterclockwise in FIG. 7 in accordance with the rotation of the downstream pulley 114. Due to the rotation of the upstream pulley 112 and the downstream pulley 114, the transport belt 116 travels along a traveling path between the upstream pulley 112 and the downstream pulley 114.

The substrate P is placed on a transport surface 116A of the transport belt 116. The transport unit 110 transports the substrate P placed on the transport belt 116 along a transport path from the upstream pulley 112 to the downstream pulley 114, and delivers the transported substrate P to the paper discharge unit 160. The substrate P is transported while horizontally holding a printed surface PA thereof at position on the transport path of the substrate P facing the printing unit 120, the imaging unit 130, the dry unit 140, and the sorting unit 150.

In the transport belt 116, a plurality of suction holes are disposed in the substrate support region that supports the substrate P. The suction holes are connected to a pump via a gas flow path. The substrate support region, the suction holes, the gas flow path, and the pump are not shown. The pump is operated to generate a negative pressure in the suction holes. The negative pressure generated in the suction hole acts on the substrate P, and the substrate P is suctioned and supported by the transport surface 116A of the transport belt 116.

The transport unit 110 can adopt a transport method other than the belt transport method, such as a drum transport method in which the substrate P is suctioned and supported by a peripheral surface of a transport drum having a cylindrical shape to transport the P, a roller transport method, and a nip transport method.

[Printing Unit]

The printing unit 120 forms the image on the substrate P based on the input image data to generate the printed article. The input image data corresponds to the original image data 40 shown in FIG. 1. The printed article corresponds to the printed article 60 shown in FIG. 1.

The printing unit 120 comprises a head 122C, a head 122M, a head 122Y, a head 122K, and a head 122W An ink jet type is applied to the head 122C, the head 122M, the head 122Y, the head 122K, and the head 122W.

The head 122C jets a cyan ink. The head 122M jets a magenta ink. The head 122Y jets a yellow ink. The head 122K jets a black ink. The head 122W jets a white ink.

The head 122C, the head 122M, the head 122Y, the head 122K, and the head 122W are disposed at fixed intervals along the transport path of the substrate P. The head 122C, the head 122M, the head 122Y, the head 122K, and the head 122W are disposed in the order of the head 122C, the head 122M, the head 122Y, the head 122K, and the head 122W from the upstream side in the substrate transport direction.

A line head can be applied to the head 122C, the head 122M, the head 122Y, the head 122K, and the head 122W. A length of the line head in a longitudinal direction corresponds to the maximum width of the substrate. The head 122C, the head 122M, the head 122Y, the head 122K, and the head 122W are disposed in a direction in which a nozzle surface on which the nozzle is disposed faces the transport belt 116. The nozzle is not shown.

The head 122C, the head 122M, the head 122Y, the head 122K, and the head 122W jet ink droplets from the nozzle toward the substrate P to form the image on the printed surface PA of the substrate P.

A single-pass method capable of performing printing on the entire surface of the substrate P by scanning the substrate P relatively with the head 122C, the head 122M, the head 122Y, the head 122K, and the head 122W only once is applied to the printing unit 120.

It should be noted that in the present specification, orthogonality is that the two directions intersect at an angle of less than 90 degrees or more than 90 degrees, but can include substantial orthogonality exhibiting the same operation and effect as a case in which two directions intersect at 90 degrees. Similarly, in the present specification, parallelism is that two directions are not parallel, but can include substantial parallelism exhibiting the same operation and effect as a case in which two directions are parallel.

In the present embodiment, the printing unit 120 comprising the head 122C, the head 122M, the head 122Y, the head 122K, and the head 122W which are an ink jet type is described as an example, but the ink jet printing device may comprise a printing unit to which another printing method such as an electrophotographic method is applied.

In the present embodiment, the printing unit 120 comprising the line head is described as an example, but the ink jet printing device may comprise a printing unit comprising the head to which another scanning method such as a serial method is applied. Also, the line head may have a structure in which a plurality of head modules are arranged along the longitudinal direction of the head.

As the jetting method of the head 122C, the head 122M, the head 122Y, the head 122K, and the head 122W, a piezo method can be applied. The piezo type head deforms the pressure chamber in accordance with the strain deformation of the piezoelectric element, and jets ink from the nozzle in accordance with the deformation of the pressure chamber. The jetting method of the head 122C, the head 122M, the head 122Y, the head 122K, and the head 122W is not limited to the piezo method. For example, a thermal method can be applied to the jetting method of the head 122C or the like.

A matrix disposition is applied to the nozzle disposition of the head 122C, the head 122M, the head 122Y, the head 122K, and the head 122W. The nozzles are not limited to the matrix disposition, and nozzle disposition other than the matrix disposition can be applied.

[Imaging Unit]

The imaging unit 130 images the printed surface PA of the substrate P to acquire the imaging data of the printed surface PA of the substrate P. The imaging data on the printed surface PA of the substrate P corresponds to the imaging data 48 of the printed article 60 shown in FIG. 1. The imaging unit 130 is disposed at a position on the downstream side of the printing unit 120 in the substrate transport direction.

The imaging unit 130 comprises a scanner 132. The scanner 132 optically reads the substrate P on which the image is printed by using the printing unit 120 to generate the imaging data of the substrate P on which the image is printed. The image can include the background 64 and the pattern 66 shown in FIG. 3.

The scanner 132 includes the imaging device that converts an optical image of the substrate P on which the image is printed into an electrical signal. A color image sensor can be applied to the imaging device. As an example of the color image sensor, a CCD image sensor and a CMOS image sensor can be applied. CCD is an abbreviation word of a charge coupled device. CMOS is an abbreviation word of a complementary metal oxide semiconductor.

The scanner 132 may include a signal processing circuit that processes a signal obtained from an illumination device and the imaging device that irradiates a reading target with illumination light to generate digital image data. The illumination device may include an optical system such as a lens.

[Dry Unit]

The dry unit 140 dries the ink on the printed surface PA of the substrate P. The dry unit 140 is disposed at a position on the downstream side of the imaging unit 130 in the substrate transport direction.

The dry unit 140 comprises a heater 142. Examples of the heater 142 include a halogen heater, an infrared heater, and the like. The heater 142 heats the printed surface PA of the substrate P and dries the ink on the printed surface PA of the substrate P. The dry unit 140 can comprise a blower member such as a fan and a blower.

[Sorting Unit]

The sorting unit 150 sorts the printed article in accordance with the result of the defect inspection of the printed article based on the imaging data of the printed article. The sorting unit 150 is disposed at a position on the downstream side of the dry unit 140 with respect to the substrate transport direction.

The sorting unit 150 comprises a stamper 152. The stamper 152 performs stamping processing of causing ink to adhere to a distal end edge of the substrate P determined as a defective printed article.

[Paper Discharge Unit]

The paper discharge unit 160 collects the substrate P on which the image is formed and which is subjected to the dry processing. The paper discharge unit 160 is disposed at a position on the downstream side of the sorting unit 150 in the substrate transport direction at the end point of the transport path of the transport unit 110. The paper discharge unit 160 comprises a paper discharge stand 162.

The paper discharge stand 162 stacks the substrates P transported by using the transport unit 110 and collects the stacked substrates P. The paper discharge stand 162 stacks the substrates P in a state in which the positions and postures of the substrates P are held to be fixed and accumulates the stacked substrates P.

The paper discharge stand 162 is configured to be able to move up and down by using an elevating device (not shown). The driving of the elevating device is controlled in conjunction with the increase and decrease of the substrates P stacked on the paper discharge stand 162. As a result, the substrate P positioned at the highest position among the substrates P stacked on the paper discharge stand 162 always has a fixed height.

[Control System of Ink Jet Printing Device]

FIG. 8 is a functional block diagram of the ink jet printing device shown in FIG. 7. The ink jet printing device 100 comprises a system controller 200. The ink jet printing device 100 is controlled by using the system controller 200.

The system controller 200 comprises a CPU 201, a ROM 202, and a RAM 203. The system controller 200 operates in accordance with the control program. CPU is an abbreviation word of a central processing unit. ROM is an abbreviation word of a read only memory. RAM is an abbreviation word of a random access memory.

The ink jet printing device 100 comprises a communication unit 204. The communication unit 204 functions as a communication interface that receives various information transmitted from a host computer 206. The communication unit 204 can comprise a buffer memory for speeding up communication.

The communication unit 204 receives the input image data transmitted from the host computer 206. The input image data input via the communication unit 204 is temporarily stored in an image memory 205 and then transmitted to a print control unit 214.

The ink jet printing device 100 comprises a transport control unit 210, a paper feed control unit 212, the print control unit 214, a dry control unit 216, a paper discharge control unit 218, the inspection device 10, and the sorting unit 150.

The transport control unit 210 receives the command signal transmitted from the system controller 200, and controls the transport unit 110 based on the control information indicated by the command signal. For example, the transport control unit 210 controls the operation of the motor which rotates the rotating shaft 114A of the downstream pulley 114 shown in FIG. 7.

The paper feed control unit 212 receives the command signal transmitted from the system controller 200, and controls the paper feeding unit 220 based on the control information indicated by the command signal. The paper feed control unit 212 controls the paper feed timing of the substrate P or the like.

The print control unit 214 receives the command signal transmitted from the system controller 200, and controls the printing unit 120 based on the control information indicated by the command signal. The print control unit 214 is provided with an image processing unit that performs the image processing on the input image data and generates the control signal of the printing unit 120.

The image processing unit is not shown. The image processing unit is provided with a plate separation processing unit that generates plate information for each color from the input image data, a correction processing unit that performs correction processing on the input image data, and a halftone processing unit that performs halftone processing on the plate information for each color to generate a halftone image.

The print control unit 214 is provided with a drive voltage generation unit which generates a drive voltage supplied to the head 122C and the like based on the input image data. The drive voltage generation unit can comprise a waveform data storage unit, a synchronization circuit, an analog-digital converter circuit, an amplification circuit, and the like.

The dry control unit 216 receives the command signal transmitted from the system controller 200, and controls the dry unit 140 based on the control information indicated by the command signal. The dry control unit 216 controls the dry temperature or the like based on a preset dry condition.

The paper discharge control unit 218 receives the command signal transmitted from the system controller 200, and controls the paper discharge unit 160 based on the control information indicated by the command signal. The paper discharge control unit 218 controls the paper discharge timing of the substrate P or the like.

The inspection device 10 performs the defect inspection of the printed article based on the imaging data of the printed article generated by using the imaging unit 130. The inspection device 10 uses a display unit 242 to perform the notification of the result of the defect inspection of the printed article.

The sorting unit 150 receives the command signal transmitted from the system controller 200, and performs sorting of the printed article in accordance with the inspection result of the printed article by using the inspection unit 30.

The ink jet printing device 100 comprises an operation unit 240 and the display unit 242. The operation unit 240 transmits an operation signal to the system controller 200 based on the operation of a user. An operating member, such as a keyboard and a mouse, is applied to the operation unit 240.

The display unit 242 displays character information indicating various types of information based on the display control signal transmitted from the system controller 200. A monitor device is applied to the display unit 242. The display unit 242 may be integrally configured with the operation unit 240 by applying a touch panel type monitor device.

The operation unit 240 and the display unit 242 can be used to configure a user interface that sets the inspection condition in the defect inspection of the printed article. For example, the display unit 242 can be used to display the initial value of the inspection condition, and the user can operate the operation unit 240 to change the inspection condition. As an example of changing the inspection condition, there is an example of adjusting the balance between the false detection avoidance performance and the correct detection performance.

The mask information in the imaging data 48 may be displayed by using the display unit 242. The setting of the inspection rule for each region in the imaging data 48 may be displayed by using the display unit 242.

The ink jet printing device 100 comprises a parameter storage unit 246 and a program storage unit 248. The parameter storage unit 246 stores various parameters applied to the ink jet printing device 100.

The system controller 200 reads out various parameters from the parameter storage unit 246 and transmits the parameters to each unit in accordance with the control of the ink jet printing device 100.

The program storage unit 248 stores various programs applied to the ink jet printing device 100. The system controller 200 reads out various programs from the program storage unit 248 and executes the programs in accordance with the control of the ink jet printing device 100.

Various processors can be applied to the hardware of various processing units of the ink jet printing device 100 shown in FIG. 8. A central processing unit (CPU) and a graphics processing unit (GPU) can be applied to various processors. The CPU is a general-purpose processor that executes a program and functions as various processing units. The GPU is a processor specialized in the image processing.

A device including a dedicated electric circuit or the like can be applied as various processors. Examples of the devices including dedicated electric circuits or the like include a programmable logic device (PLD) and an application specific integrated circuit (ASIC). The PLD is a processor of which the circuit configuration can be changed after the device is manufactured. The ASIC is a processor having the dedicated circuit configuration designed to perform specific processing.

One processing unit may be configured by using one of the processors described above, or may be configured by using two or more processors. As an example in which one processing unit is configured by using two or more processors, there is an example in which one processing unit is configured by using the same type of processor and an example in which one processing unit is configured by using different types of processors.

As an example in which one processing unit is configured by using the same type of processors, there is an example of using two or more FPGAs. As an example in which one processing unit is configured by using different types of processors, there is an example in which one processing unit is configured by using one or more CPUs and one or more FPGAs.

A plurality of processing units may be configured by using one processor. As an example in which a plurality of processing units are configured by using one processor, there is a mode in which one processor is configured by applying a combination of one or more CPUs and a program, and the processor having such a configuration functions as a plurality of processing units. Specific examples of such a mode include a computer such as a server device and a client device.

As another example in which a plurality of processing units are configured by using one processor, there is a mode in which a processor is used, which realizes the functions of the entire system including a plurality of processing units by using one IC chip is used.

A specific example of such a mode is a system on chip. IC is an abbreviation word of an integrated circuit, which represents an integrated circuit. The system on chip may be described as a system on chip (SoC) using English notation.

Various processing units are configured, as a hardware structure, by using one or more various processors. The hardware structure of various processors is an electric circuit in which circuit elements such as semiconductor elements are combined. The electric circuit may be described as circuitry using English notation.

[Application Example to Printing Device Other Than Ink Jet Type]

In the present embodiment, the ink jet type printing device is described as an example, but the reading method shown in the present embodiment can also be applied to the printing devices of other methods in which the coloring material adheres to the substrate by using the printing element such as the electrophotographic method.

In the embodiment of the present invention described above, the configuration requirements can be appropriately changed, added, or deleted without departing from the gist of the present invention. The present invention is not limited to the embodiment described above, and many modifications can be made by a person having ordinary knowledge in the art within the technical idea of the present invention.

EXPLANATION OF REFERENCES

10: inspection device
20: image data acquisition unit
22: imaging data acquisition unit
24: information extraction unit
26: mask information generation unit
28: inspection level set unit
30: inspection unit
32: inspection result output unit
40: original image data
42: base background color information
44: mask information
46: inspection level
48: imaging data
50: inspection result
60: printed article 62: transparent substrate
64: background
66: pattern
66A: part of pattern
68: substrate region
70: printed article
72: transparent substrate
74: background
76: pattern
76A: part of pattern
78: substrate region
80: defect
82: defect
84: defect
100: ink jet printing device
110: transport unit
112: upstream pulley
112A: rotating shaft
114: downstream pulley
114A: rotating shaft
116: transport belt
116A: transport surface
120: printing unit
122C: head
122M: head
122Y: head
122K: head
122W: head
130: imaging unit
132: scanner
140: dry unit
142: heater
150: sorting unit
152: stamper
160: paper discharge unit
162: paper discharge stand
200: system controller
201: CPU
202: ROM
203: RAM
204: communication unit
205: image memory
206: host computer
210: transport control unit
212: paper feed control unit
214: print control unit
216: dry control unit
218: paper discharge control unit
220: paper feeding unit
240: operation unit
242: display unit
244: parameter storage unit
246: program storage unit
P: substrate
PA: printed surface
S10 to S22: each step of inspection method

What is claimed is:

1. An inspection method comprising:
an imaging data acquisition step of acquiring imaging data of a printed article using a special substrate;
a non-printing region positional information acquisition step of acquiring information for specifying a position of a non-printing region in the imaging data, the non-printing region corresponding to a substrate region of the printed article on which a pattern and a background of the pattern are not printed;
an inspection step of specifying the non-printing region based on the information for specifying the position of the non-printing region, analyzing the imaging data by applying a predetermined inspection rule, and performing an inspection of the printed article; and
a notification step of performing a notification of an inspection result of the printed article and not performing a notification of an inspection result indicating that a defect is present in the substrate region of the printed article corresponding to the non-printing region.

2. The inspection method according to claim 1, further comprising:
a pattern positional information acquisition step of acquiring information for specifying a position of a pattern region in the imaging data, the pattern region corresponding to the pattern in the printed article;
a background positional information acquisition step of acquiring information for specifying a position of a background region in the imaging data, the background region corresponding to the background in the printed article; and
an inspection rule setting step of setting an inspection rule for each of the non-printing region in the imaging data, the pattern region in the imaging data, and the background region in the imaging data and setting a different inspection rule for the non-printing region in the imaging data from those for the pattern region in the imaging data and the background region in the imaging data.

3. The inspection method according to claim 2,
wherein in the non-printing region positional information acquisition step, mask information on the non-printing region in the imaging data is generated from information on a print position of the background, and the position of the non-printing region in the imaging data is specified based on the mask information.

4. The inspection method according to claim 3,
wherein in the background positional information acquisition step, the position of the background region in the imaging data is specified from information on a print position of a color applied to the background.

5. The inspection method according to claim 2,
wherein in the non-printing region positional information acquisition step, mask information on the non-printing region in the imaging data is generated from information on a print position of the background and information on a print position of the pattern, and the position of the non-printing region in the imaging data is specified based on the mask information.

6. The inspection method according to claim 5,
wherein in the background positional information acquisition step, the position of the background region in the imaging data is specified from information on a print position of a color applied to the background, and
in the pattern positional information acquisition step, the position of the pattern region in the imaging data is specified from information on a print position of a color applied to the pattern.

7. The inspection method according to claim 2,
wherein in the pattern positional information acquisition step, a position of the pattern in the printed article is specified from input image data of the printed article, and the position of the pattern region in the imaging data is specified based on the position of the pattern in the printed article.

8. The inspection method according to claim 2,
wherein in the background positional information acquisition step, a position of the background in the printed article is specified from input image data of the printed article, and the position of the background region in the imaging data is specified based on the position of the background in the printed article.

9. The inspection method according to claim 2,
wherein in the non-printing region positional information acquisition step, a position of the background in the printed article is specified from input image data of the printed article, and the position of the non-printing region in the imaging data is specified based on the position of the background in the printed article.

10. The inspection method according to claim 2,
wherein in the non-printing region positional information acquisition step, a position of the pattern in the printed article and a position of the background in the printed article are specified from input image data of the printed article, and the position of the non-printing region in the imaging data is specified based on the position of the pattern in the printed article and the position of the background in the printed article.

11. The inspection method according to claim 2,
wherein in the inspection step, an inspection of the non-printing region in the imaging data is not performed.

12. The inspection method according to claim 2,
wherein in the inspection rule setting step, an inspection algorithm is set for each of the non-printing region in the imaging data, the pattern region in the imaging data, and the background region in the imaging data.

13. The inspection method according to claim 12,
wherein in the inspection rule setting step, in a case in which the defect occurs in the printed article, an algorithm for detecting a region in which a pixel value of the imaging data decreases as compared with a case in which the defect does not occur in the printed article is set or an algorithm for detecting a region in which the pixel value of the imaging data increases as compared with a case in which the defect does not occur in the printed article is set.

14. The inspection method according to claim 12,
wherein in the inspection rule setting step, an inspection threshold value is set.

15. The inspection method according to claim 12,
wherein in the inspection rule setting step, it is set whether to perform or not to perform the inspection.

16. The inspection method according to claim 1,
wherein the special substrate includes a transparent substrate.

17. The inspection method according to claim 1,
wherein a white ink is applied to the background of the pattern.

18. The inspection method according to claim 1,
wherein the printed article is printed by applying an ink jet type printing device.

19. An inspection device comprising:
an imaging data acquisition unit that acquires imaging data of a printed article using a special substrate;
a non-printing region positional information acquisition unit that acquires information for specifying a position of a non-printing region in the imaging data, the non-printing region corresponding to a substrate region of the printed article on which a pattern and a background of the pattern are not printed;
an inspection unit that specifies the non-printing region based on the information for specifying the position of the non-printing region, analyzes the imaging data by applying a predetermined inspection rule, and performs an inspection of the printed article; and
a notification unit that performs a notification of an inspection result of the printed article, the notification unit not performing a notification of an inspection result indicating that a defect is present in the substrate region of the printed article corresponding to the non-printing region.

20. A printing device comprising:
a printing unit that performs printing on a special substrate; and
an inspection device that inspects a printed article generated by using the printing unit,
wherein the inspection device includes
an imaging data acquisition unit that acquires imaging data of the printed article,
a non-printing region positional information acquisition unit that acquires information for specifying a position of a non-printing region in the imaging data, the non-printing region corresponding to a substrate region of the printed article on which a pattern and a background of the pattern are not printed,
an inspection unit that specifies the non-printing region based on the information for specifying the position of the non-printing region, analyzes the imaging data by applying a predetermined inspection rule, and performs an inspection of the printed article, and
a notification unit that performs a notification of an inspection result of the printed article, the notification unit not performing a notification of an inspection result indicating that a defect is present in the substrate region of the printed article corresponding to the non-printing region.

21. A non-temporary computer-readable storage medium that causes a computer to execute, in a case in which a command stored in the storage medium is read by the computer,
an imaging data acquisition function of acquiring imaging data of a printed article using a special substrate,
a non-printing region positional information acquisition function of acquiring information for specifying a position of a non-printing region in the imaging data, the non-printing region corresponding to a substrate region of the printed article on which a pattern and a background of the pattern are not printed,
an inspection function of specifying the non-printing region based on the information for specifying the position of the non-printing region, analyzing the imaging data by applying a predetermined inspection rule, and performing an inspection of the printed article, and
a notification function of performing a notification of an inspection result of the printed article and not performing a notification of an inspection result indicating that a defect is present in the substrate region of the printed article corresponding to the non-printing region.

* * * * *